United States Patent [19]

Preiss et al.

[11] 4,390,356

[45] Jun. 28, 1983

[54] APPARATUS FOR PREVENTING SNOW BUILDUP IN A CARBON DIOXIDE SNOW CYCLONE SEPARATOR

[75] Inventors: Martin D. Preiss, Chicago; Peter A. Students, Westchester, both of Ill.

[73] Assignee: Cardox Corporation, San Francisco, Calif.

[21] Appl. No.: 307,921

[22] Filed: Oct. 2, 1981

[51] Int. Cl.³ .............................................. F25J 1/00
[52] U.S. Cl. ........................................ 62/35; 62/10; 55/300; 15/94
[58] Field of Search ...................... 62/10, 35; 55/300; 15/94

[56] References Cited

U.S. PATENT DOCUMENTS

| | | | |
|---|---|---|---|
| 3,786,644 | 1/1974 | Rich et al. | 62/10 |
| 3,808,776 | 5/1974 | Jesernig et al. | 55/300 |
| 4,325,720 | 4/1982 | Students | 62/10 |

Primary Examiner—Norman Yudkoff
Attorney, Agent, or Firm—George F. Bethel; Patience K. Bethel

[57] ABSTRACT

A cyclone separator for generating snow from liquid carbon dioxide comprising a flexible frustoconical member having an open upper end and an open lower end and defining a separation chamber. Injection nozzles having orifices for injecting liquid carbon dioxide located in the upper end of the separation chamber. Each injection nozzle is radially spaced inwardly from the frustoconical member and the orifice of each nozzle is directed outwardly toward the frustoconical member so that liquid carbon dioxide injected into the separation chamber forms a mixture of snow and vapor which is discharged from the open lower end of the frustoconical member. A mechanical impactor mounted at the lower end of the frustoconical member to contact the frustoconical member and loosen snow which builds up in the separation chamber.

13 Claims, 3 Drawing Figures

APPARATUS FOR PREVENTING SNOW BUILDUP IN A CARBON DIOXIDE SNOW CYCLONE SEPARATOR

BACKGROUND OF THE INVENTION

1. Field of the Invention

This invention relates generally to cyclone type carbon dioxide snow generators and more particularly to a cyclone type snow generator designed to prevent the buildup of snow in the separation chamber.

2. Description of the Prior Art

In the manufacture of carbon dioxide snow by flashing liquid carbon dioxide, a mixture of the carbon dioxide snow and vapor is created. It is desirable to separate the snow from the vapor, and numerous devices have been developed to accomplish this result. One such device is a cyclone separator which operates by the combined actions of centrifugal force and gravity to separate the snow from the vapor. Such a separator is well known in the art.

A problem which occurs with a cyclone type separator forming snow from liquid carbon dioxide is the buildup of snow on the inside surface of the separator cone as the carbon dioxide expands through the nozzle orifices. Snow builds up on the inside surface of the cone adjacent to the lower discharge end, and the buildup increases until eventually the discharge end of the cone is completely blocked. Additional snow builds up at the upper end of the cone adjacent to the injection nozzles. This snow buildup on the cone wall cause a progressive decrease in the efficiency of the cyclone type separator and eventually the separator ceases to operate. A fresh buildup of snow is difficult to break up because it is held together by a static charge and it is flexible. In order to remove built-up snow by vibrating the cone, the magnitude of the vibrations is so great that the cone is damaged.

SUMMARY OF THE INVENTION

The present invention prevents buildup of snow in the separation chamber of a cyclone type separator by the location of the liquid carbon dioxide injection nozzles and the direction of the orifices of the injection nozzles relative to the wall of the cone and by constructing the cone from a flexible material. Additionally, the cone wall may be mechanically deformed to flex the cone wall and thereby shake loose snow which has built up on the inside surface thereof especially at the lower discharge end. The mechanical deformation of the cone wall is followed by a number of sharp impacts.

The location and direction of the orifices in the liquid carbon dioxide injection nozzles are importatnt in preventing snow buildup on the upper part of the inside surface of the cone. The injection nozzles are located toward the center of the cone and direct the carbon dioxide toward the outer perimeter of the cone circle rather than tangentially to the cone circle. This nozzle location and flow direction of the carbon dioxide result in a flow pattern within the separation chamber that prevents snow buildup and creates cone vibrations which aid in reducing snow buildup. The use of a flexible material for the cone assists in preventing the buildup of snow on the cone wall since the cone wall can flex and loosen built-up snow. This movement of the cone may be enhanced by a mechanical impactor which intermittently strikes the outside surface of the cone adjacent to the lower discharge end to assist in shaking loose any built-up snow. This deformation of the cone is analogous to a low frequency shock wave.

DESCRIPTION OF THE PREFERRED EMBODIMENTS

Figure 1:
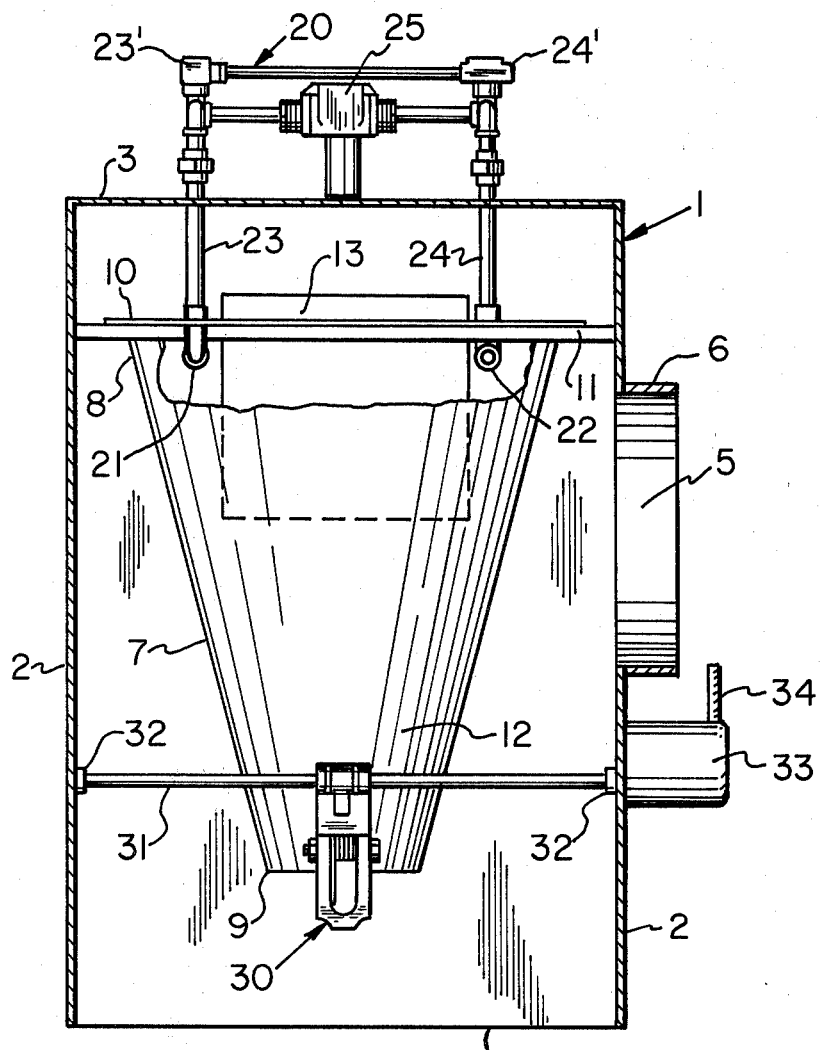
FIG. 1 is a section on line I—1 of FIG. 2 with the mechanical impactor in the vertical position.

FIG. 1 shows a cyclone type separator for generating snow from liquid carbon dioxide. The separator is located within a housing 1 having side walls 2, a top wall 3 and an open bottom 4. A vapor outlet 5 is formed in a side wall 2 and a conduit 6 is attached to the outside of wall 2 adjacent outlet 5 for connection with an in-plant exhaust system. The separator includes an inverted cone 7 mounted within housing 1 with its longitudinal axis in the vertical position.

Figure 2:
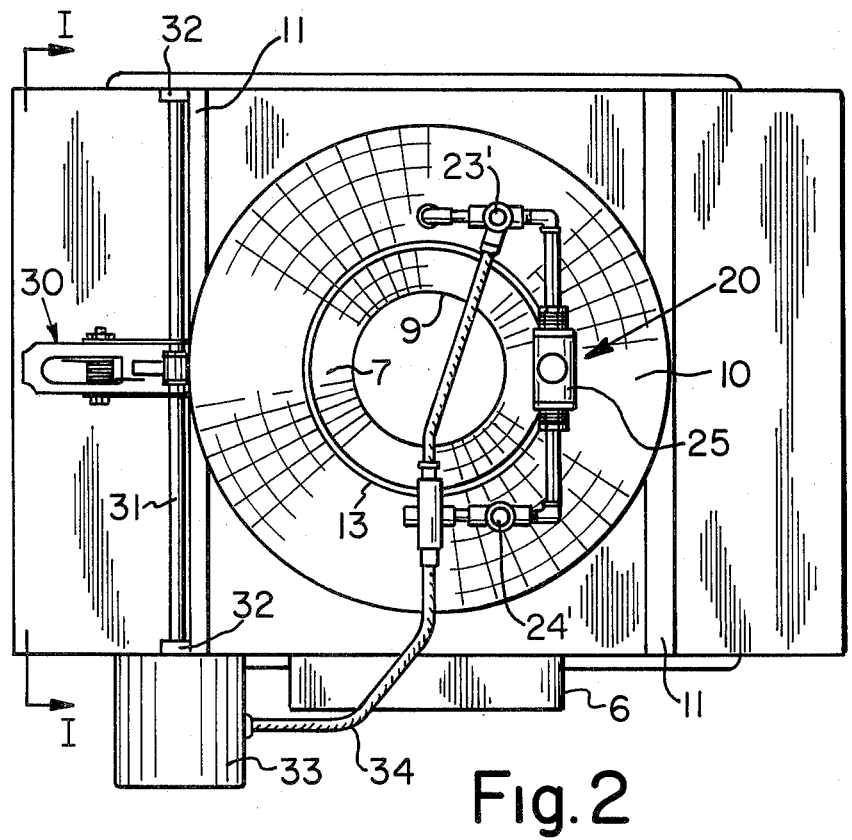
FIG. 2 is a plan view of the apparatus with the top of the housing removed to show the mechanical impactor in a horizontal position.

The cone is actually a frustoconical member having its base 8 at the top and a smaller open discharge end 9 at the bottom spaced from bottom wall 4 of housing 1. An annular member 10 is attached to the cone at base 8 and engages spaced parallel cross members 11 which are attached to side walls 2 of housing 1 to support and locate the cone within the housing as shown in FIGS. 1 and 2. The cone defines a separation chamber 12 which extends from base 8 at the top to lower discharge end 9 at the bottom.

An elongated tube 13 is located coaxially with both cone 7 and annular member 10 and extends from about the annular member downwardly through the central hole in the annular member into the upper end of separation chamber 12. The exterior of tube 13 is attached to the annular member to keep the tube in position. The location of tube 13 and the location of the liquid carbon dioxide injection nozzles along with the direction of the orifices in the injection nozzles minimize snow buildup in the separation chamber as explained hereinafter.

Cone 7 and tube 13 are made from a flexible plastic material such as polyethylene or polypropylene. These materials have properties which make them suitable for making the cone and the tube. They remain flexible at temperatures down to about −110° F. and are sufficiently durable to withstand the abrasive action and the impact of the carbon dioxide as it is ejected from the nozzle orifices. Also, the materials are inert to carbon dioxide and are formable while being sufficiently rigid to maintain a frustoconical shape once the cone has been formed. The materials also have low porosity and good lubricity.

A snow generator assembly 20 having a pair of nozzles 21 and 22 with orifices for injecting liquid carbon dioxide into the upper end of cone 7 is located away from the wall of the cone and close to the outside of downwardly depending tube 13. This location differs from the location of the nozzles close to the perimeter of the cone in the prior art. The orifice of each nozzle is directed toward the outer perimeter of the cone circle rather than tangentially to the cone circle as in the prior art. The snow generator assembly includes a conduit 23 supplying nozzle 21 and a similar conduit 24 supplying nozzle 22. Each conduit extends downwardly through a hole in annular member 10 into cone 7. Assembly 20 is in a selective flow communication with a source of liquid carbon dioxide (not shown), and liquid carbon dioxide is supplied to conduits 23 and 24 through a tee fitting 25. The flow to conduits 23 and 24 is controlled by solenoid valves 23' and 24' which are located between the conduits and tee fitting 25.

The location of nozzles 21 and 22 toward the center of the cone adjacent to tube 13 rather than close to the outer perimeter of the cone and the direction of the spray toward the cone circle rather than tangentially to the cone circle are important in preventing snow buildup in the upper end of the separator cone. This nozzle location and orifice direction create a flow pattern within the cone which induces the cone to vibrate. The vibrations reduce the snow buildup on the cone.

A mechanical impactor 30 is provided adjacent to the lower discharge end of cone 7 in order to flex the cone to dislodge snow built up on the cone adjacent to the discharge end. The mechanical impactor is mounted on a rotary shaft 31 which is supported at its ends in bearings 32 mounted in opposite walls 2 of housing 1. One end of shaft 31 is driven through a gear reducer by a standard electric motor (not shown) located within a housing 33 which is attached to the exterior of a side wall 2 of housing 1. A flexible conduit 34 carries electrical wires to provide power to the electric motor.

Figure 3:
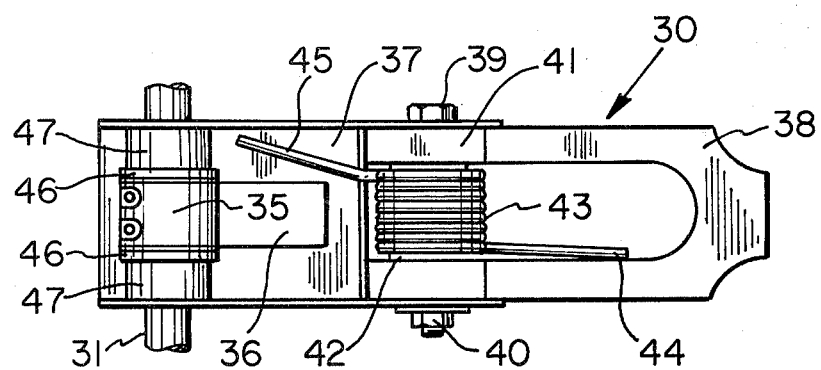
FIG. 3 is an enlarged view of the mechanical impactor.

As seen in detail in FIG. 3 of the drawings, the impactor 30 includes a locking collar 35 which is locked to drive shaft 31 for rotation with the drive shaft and which supports impactor crank 36. An impact arm 37 is mounted on bearings 46 which are carried on shaft 31 on opposite sides of locking collar 35. The impact arm has a pair of bearing spacers 47 which fit over that portion of bearings 46 which surround shaft 31 so that impact arm 37 is not locked to shaft 31 and is not driven by shaft 31. A contact member 38 is pivotally attached to impact arm 37 by a machine screw 39 having a nut 40 in its threaded end. The machine screw 39 extends through spaced lugs 41 on contact member 38. A sleeve 42 surrounds the central portion of machine screw 39 between lugs 41, and a torsion spring 43 is mounted around the sleeve with one end 44 in contact with contact member 38 and the other end 45 in contact with impact arm 37. The torsion spring permits contact member 38 to rotate about machine screw 39 and to be returned to its original position as a straight extension of impact arm 37.

Rotation of drive shaft 31 by the electric motor moves impactor 30 in the upward direction toward the lower discharge end of cone 7 so that contact member 38 contacts the exterior surface of the lower end of cone 7 to deform it inwardly and simultaneously compress spring 43. As the shaft continues to rotate, contact member 38 pivots about machine screw 39 against the force of the compressed torsion spring 43 until it is out of contact with the exterior of cone 7 at which point the wall of the cone flexes outwardly and the torsion spring snaps contact member 38 into a straight extended relationship with impact arm 37 as shown in FIG. 3 of the drawings. The momentum created by the spring recoil swings impact arm 37 and contact member 38 around shaft 31 on bearings 46 approximately ten times faster than the speed of rotation of the shaft, and contact member 38 again contacts the exterior of cone 7 and imparts a shock to the cone. The movement of the flexible cone and spring 43 recoil contact member 38 back into impactor crank 36 which is rotating with shaft 31 and as a result of this coaction between the rotating shaft and torsion spring 43, contact member 38 will contact the exterior of cone 7 a total of three times for every revolution of shaft 31 and impactor crank 36. Continuous rotation of shaft 31 again brings the contact member into contact with the lower discharge end of cone 7. The frequency of contact between contact member 38 and the lower discharge end of cone 7 is determined by the revolutions per minute of shaft 31 and the spring constant of spring 43. The impactor provides for deformation of the cone wall after which it springs back to its original position followed by several sharp impacts. Snow breaks loose from the cone wall, and the swirling action of the carbon dioxide pulls the snow away from the wall and out of the lower discharge end of the cone. It will be understood by those skilled in the art that an impactor having other than rotary motion may also be used.

The action of the impactor combined with the flexible material from which the cone is formed and the location and direction of the carbon dioxide injection nozzles induces continuous cleaning of the inside of the cone. Thus, there is no buildup of snow in the cone and an efficient operation is achieved wherein a constant supply of snow is provided from the lower discharge end of the cone. Even though an impactor may not be required due to the location and direction of the injection nozzles and the flexibility of the material from which the cone is formed, it is advantageous to use an impactor as it assists in shaking snow loose from the inner surface of the cone wall. Alternatively, the cyclone type separator of the invention may have the injection nozzles located and directed according to the prior art in which case an impactor will be sufficient to shake snow loose from the inner surface of the cone wall.

While preferred embodiments of the invention are described herein, it is to be understood that the invention may be embodied within the scope of the appended claims.

We claim:

1. A cyclone separator for generating snow from liquid carbon dioxide comprising a flexible frustoconical member defining a separation chamber, said frustoconical member having a partially open upper end and an open lower end, means supporting said frustoconical member in an inverted position with its longitudinal axis oriented vertically, a plurality of injection nozzles located in the upper end of said separation chamber and radially spaced inwardly from the walls of said frustoconical member, each of said injection nozzles having an orifice for injecting liquid carbon dioxide into said separation chamber, the orifice of each of said nozzles being directed outwardly toward the walls of said frustoconical member, whereby liquid carbon dioxide injected into said separation chamber forms a mixture of snow and vapor which directly impinges against the walls of said frustoconical member to create induced vibrations therein to reduce carbon dioxide snow buildup and wherein the combined actions of centrifugal force and gravity separate snow from vapor permitting the snow and the vapor to be discharged from said open lower end of said frustoconical member.

2. A cyclone separator as set forth in claim 1 wherein said frustoconical member is constructed of a flexible plastic material.

3. A cyclone separator as set forth in claim 2 wherein said flexible plastic material is polyethylene.

4. A cyclone separator as set forth in claim 1 including a mechanical impactor, means mounting said mechanical impactor adjacent said open lower end of said frustoconical member and means for moving said mechanical impactor into contact with the outer surface of said frustoconical member adjacent said open lower end to deform it inwardly followed by several intermittent impacts to said frustoconical member to break up any built up snow upon said deformation and create a shock to said frustoconical member by said subsequent impacts, which is analogous to a low frequency shock wave, whereby snow built up on the inner surface of said frustoconical member is loosened from said frustoconical member to pass through said open lower end.

5. A cyclone separator as set forth in claim 4 wherein said means mounting said mechanical impactor is a drive shaft and said means for moving said mechanical impactor is an electric motor connected to said drive shaft whereby said frustoconical member is deformed once and impacted twice with each rotation of said drive shaft.

6. A cyclone separator as set forth in claim 5 wherein said mechanical impactor includes a first member fixed to said drive shaft for rotation with said drive shaft, a second member rotatably mounted on said drive shaft, a third member pivotally connected to said second member and a spring biasing means between said second and third members of said mechanical impactor to urge said second and third members into an extended straight relationship, whereby rotation of said drive shaft causes said third member to contact the lower end of said frustoconical member and to pivot relative to said second member against the action of said spring biasing means and said spring biasing means urges said third member to an extended straight relationship with said second member.

7. A cyclone separator as set forth in claim 1 including an elongated tube mounted at said partially open upper end of said frustoconical member and coaxial with said frustoconical member, said tube extending downwardly into the upper end of said separation chamber and said injection nozzles being located close to the outer surface of said tube.

8. A cyclone separator as set forth in claim 1 wherein said means supporting said frustoconical member is an annular member attached to the upper end of said frustoconical member, said annular member adapted to rest upon support members for said frustoconical member.

9. A cyclone separator for generating snow from liquid carbon dioxide comprising a flexible frustoconical member defining a separation chamber, said separation chamber having a partially open upper end and an open lower end, means supporting said frustoconical member in an inverted position with its longitudinal axis oriented vertically, a plurality of injection nozzles located in the upper end of said separation chamber, each of said injection nozzles having an orifice for injecting liquid carbon dioxide into said separation chamber, a mechanical impactor, means mounting said mechanical impactor adjacent said open lower end of said frustoconical member and means for moving said mechanical impactor into contact with the outer surface of said frustoconical member adjacent said open lower end to deform it inwardly followed by several intermittent impacts to said frustoconical member to break up any built up snow upon said deformation and create a shock to said frustoconical member by said subsequent impacts, which is analogous to a low frequency shock wave, whereby liquid carbon dioxide injected into said separation chamber forms a mixture of snow and vapor which is discharged from said open lower end of said frustoconical member and snow built up on the inner surface of said frustoconical member is loosened by said mechanical impactor.

10. A cyclone separator as set forth in claim 9 wherein said means mounting said mechanical impactor is a drive shaft and said means for moving said mechanical impactor is an electric motor connected to said drive shaft.

11. A cyclone separator as set forth in claim 10 wherein said mechanical impactor includes a first member fixed to said drive shaft for rotation with said drive shaft, a second member rotatably mounted on said drive shaft, a third member pivotally connected to said second member and a spring biasing means between said second and third members of said mechanical impactor to urge said second and third members into an extended straight relationship, whereby rotation of said drive shaft causes said third member to contact the lower end of said frustoconical member and to pivot relative to said second member against the action of said spring biasing means and said spring biasing means urges said third member to an extended straight relationship with said second member.

12. A cyclone separator as set forth in claim 9 wherein said flexible frustoconical member is constructed of a plastic material.

13. A cyclone separator as set forth in claim 9 wherein said flexible frustoconical member is constructed of polyethylene.

* * * * *